S. M. PRENTICE.
Seed Planter.
No. 47,855.
Patented May 23, 1865.
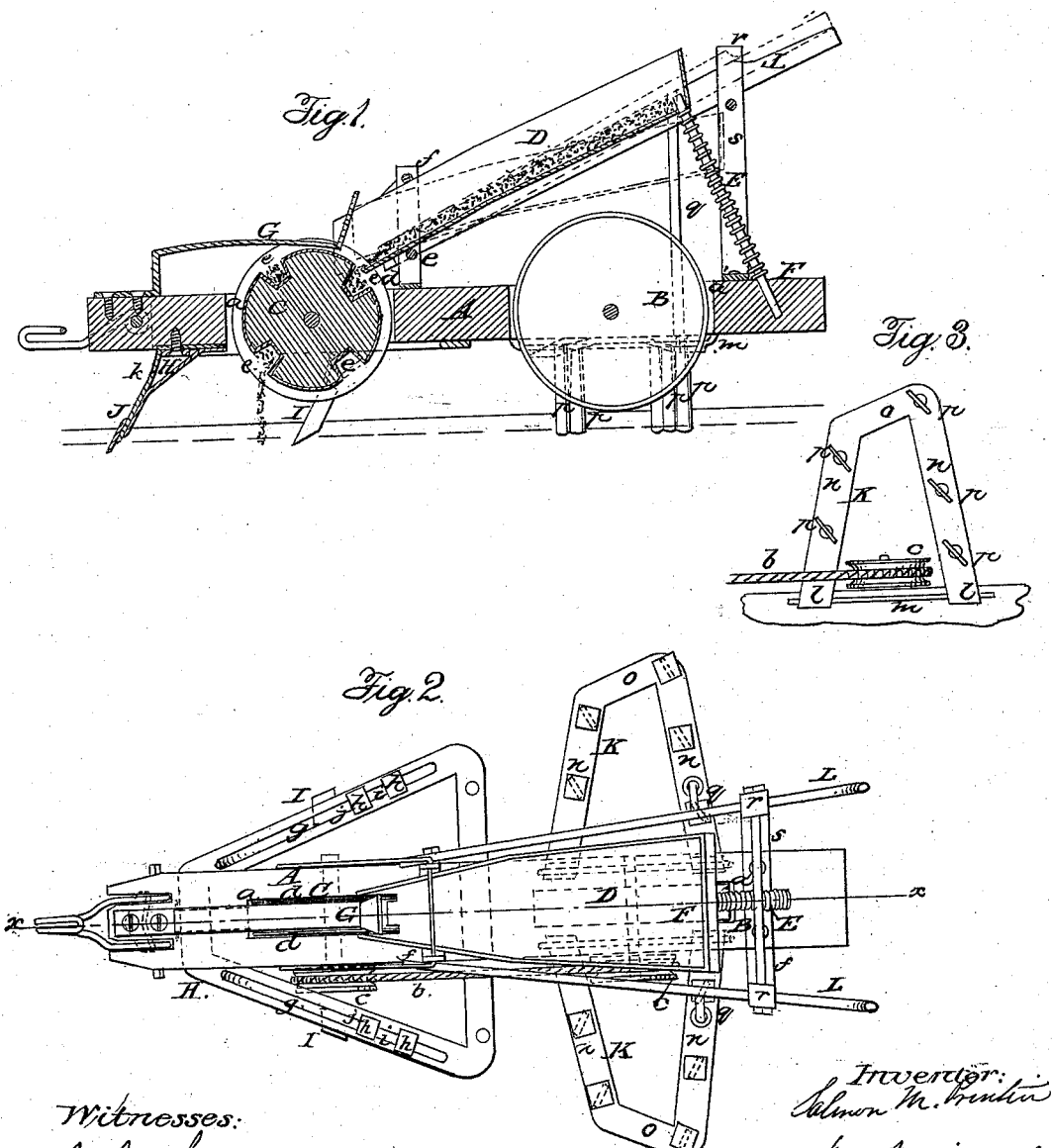

UNITED STATES PATENT OFFICE.

SALMON M. PRENTICE, OF SOUTHINGTON, OHIO.

IMPROVEMENT IN SEEDING-MACHINES.

Specification forming part of Letters Patent No. 47,855, dated May 23, 1865.

*To all whom it may concern:*

Be it known that I, SALMON M. PRENTICE, of Southington, in the county of Trumbull and State of Ohio, have invented a new and Improved Seeding-Machine; and I do hereby declare that the following is a full, clear, and exact description of the same, reference being had to the accompanying drawings, making a part of this specification, in which—

Figure 1 is a side sectional view of my invention, taken in the line $x\ x$, Fig. 2; Fig. 2, a plan or top view of the same; Fig. 3, an inverted plan of one of the tooth-frames of the device.

Similar letters of reference indicate corresponding parts in the several figures.

This invention relates to a new and improved seeding-machine designed for general use—that is to say, for planting various kinds of seed; and it consists in the employment or use of a self-adjusting hopper, in connection with a seed-distributing wheel and adjustable shares or teeth, all arranged to operate as herein set forth.

To enable those skilled in the art to fully understand and construct my invention, I will proceed to describe it.

A represents the beam of the plow, which may be of any suitable dimensions, and provided with two slots or openings, $a\ a'$, to receive the wheels B C, the former supporting the back part of the machine and the latter being the seed-distributing wheels, which are driven or rotated by a rope or belt, $b$, from the axle of the wheel B, said rope or belt passing over pulleys $c$ on the axes of the two wheels, as shown in Fig. 2. The beam A may be formed of one piece or of two longitudinal pieces connected by bolts, and the seed-distributing wheel C has a circular disk, D, attached concentrically to it at each side, and of larger diameter than the wheel to form a groove all around it. The periphery of the wheel C has recesses or seed-cells $e$ made in it at suitable and equal distances apart.

D represents a seed-box or hopper, which may be constructed of wood or metal, and has its back end resting on a spiral spring, E, placed on a rod, F, which is at the back part of the beam A, and has an inclined position, as shown clearly in Fig. 1, the rod F passing through the back part of the seed box or hopper D. The front end of the seed box or hopper is in contact with the periphery of the seed-distributing wheel C, the sides at the front end lapping over the edges of the disks $d\ d$.

G is a cut-off formed of a curved bar, which is attached to the front end of the beam A, and extends back over the periphery of the distributing-wheel C and in contact with it, and then projects upward between the front ends of the sides of the seed box or hopper. The front part of the seed box or hopper rests on a cross-bar, $e'$, which is fitted horizontally between uprights $f\ f$, attached to the beam A.

To the under side of the beam A at its front part there is permanently attached a triangular bar, H, the two opposite sides of which are slotted longitudinally nearly their whole length, as shown at $g\ g$ in Fig. 2. These slots $g\ g$ receive the bolts $h$ of plates $i$, to which the standards $j$ of shares I are attached, and by means of the slots $g$ the shares I may be adjusted farther forward or backward and nearer to or farther from the sides of the wheel C, as may be required for the proper covering of the seed.

To the front end of the beam A there is secured a stationary standard, $k$, having a share, J, attached to it.

K K represent two frames, which are connected by hinges or joints, one to each side of the beam A. These hinges or joints may be formed by bending the bars which compose the frames at their inner ends so as to form eyes $l$, and having said eyes fitted on rods $m$ at the under side of the beam, as shown in Fig. 3. The bars which compose the frames K K are bent, as shown clearly in Fig. 2, so as to have a front and rear side, $n\ n$, slightly out of parallel with each other, and oblique end $o$.

To each frame K there are attached a series of vertical flat teeth or shares, $p$, having an oblique position, as indicated in Fig. 3 and by the dotted lines in Fig. 2. The rear sides, $n$, of the frames K are connected by rods $g$ to the handles L L of the device. The front ends of the handles L are fitted on the ends of the cross-bar or rod $e'$, and the back parts of the handles are fitted in loops $r$ at the upper ends of bars $s\ s$, attached to the back part of the beam A, said loops admitting of a certain degree of play of the handles in them. By this arrangement the depth of the penetration of the teeth or shares $p$ may be regulated, as circumstances may require, by the driver as the machine is drawn along, and the teeth or shares may be made to pass over and clear obstacles and to yield or conform to the undulating surface of the ground.

The seed to be planted is placed in the seed box or hopper D, which will have a greater or less inclined position, according to the quality of seed placed in it. When the seed-box is quite full the seed will have a tendency to feed rapidly down to the wheel C, and if the seed-box were stationary the feed would diminish as the seed diminishes in it. This variation in the feed, however, is prevented by the spring E, which gradually raises the back end of the seed-box as the seed passes out of it, and the weight of the seed-box and contents diminish, and consequently gives it a more inclined position, so as to render the feed or supply of seed to the wheel C uniform. The seed in leaving the seed-box D passes into the cells e, the filled cells passing underneath the cut-off G, and discharged into the furrow made by the share J, the seed being covered by the shares I, which are adjusted in the desired position to effect that purpose, the earth being loosened and harrowed at each side by the teeth or shares p, which render the soil light and friable to favor the rapid germination of the seed.

Having thus described my invention, what I claim as new, and desire to secure by Letters Patent, is—

The seed box or hopper D, resting at its back end upon a spring, E, substantially as shown, and for the purpose of feeding and supplying the seed uniformly to the distributing-wheel C, as set forth.

SALMON M. PRENTICE.

Witnesses:
 DAVID HATCH,
 A. S. HATCH.